US006299266B1

(12) United States Patent
Justice et al.

(10) Patent No.: US 6,299,266 B1
(45) Date of Patent: *Oct. 9, 2001

(54) MOUNTING ARRANGEMENT FOR COMPUTER AND OTHER UNITS

(75) Inventors: Frederic Justice, Voreppe (FR); Chin-Shun Chang, Taipei (TW)

(73) Assignee: Hewlett-Packard Company, Palo Alto, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/415,666

(22) Filed: Oct. 12, 1999

(51) Int. Cl.⁷ .................................................... A47B 81/00
(52) U.S. Cl. ......................... 312/223.2; 361/685; 292/87
(58) Field of Search .............................. 312/223.1, 223.2, 312/333; 361/685, 725, 683; 439/352, 353, 354; 248/674; 70/57.1; 292/87

(56) References Cited

U.S. PATENT DOCUMENTS

| 4,938,513 | * | 7/1990 | Gunderson ........................ 292/87 X |
| 4,979,909 | | 12/1990 | Andrews ............................... 439/352 |
| 5,123,721 | * | 6/1992 | Seo .................................. 439/354 X |
| 5,262,923 | | 11/1993 | Batta et al. ........................... 361/685 |
| 5,301,088 | | 4/1994 | Liu ....................................... 361/685 |
| 5,340,340 | | 8/1994 | Hastings et al. ....................... 439/64 |
| 5,682,291 | * | 10/1997 | Jeffries et al. ................. 312/223.2 X |
| 5,722,705 | * | 3/1998 | Deguchi ................................. 292/87 |
| 5,768,099 | | 6/1998 | Radloff et al. ....................... 361/685 |
| 5,788,211 | | 8/1998 | Astier .................................. 248/674 |
| 5,802,890 | * | 9/1998 | Espada-Velasco .................... 70/57.1 |
| 5,806,949 | * | 9/1998 | Johnson ............................ 361/685 X |
| 5,828,547 | | 10/1998 | Francovich et al. ................. 361/685 |
| 5,921,644 | * | 7/1999 | Brunel et al. ..................... 312/223.2 |
| 5,980,003 | * | 11/1999 | Huang .............................. 312/223.2 |

FOREIGN PATENT DOCUMENTS

96/00938    1/1996   (WO) .

* cited by examiner

*Primary Examiner*—Peter M. Cuomo
*Assistant Examiner*—James O. Hansen

(57) ABSTRACT

A mounting arrangement for mounting in a computer a subsystem unit, such as a CD-ROM or hard disk drive, provided with side fixing holes, the arrangement comprising a tray having two upstanding side walls that generally define a space for receiving a subsystem unit, at least one of the side walls being provided with at least one retractable stud and a resilient member for biasing the stud into a position in which the stud extends into the space defined by the side walls in order to engage a side fixing hole in a subsystem unit.

25 Claims, 3 Drawing Sheets

MOUNTING ARRANGEMENT FOR COMPUTER AND OTHER UNITS

FIELD OF THE INVENTION

The present invention relates to a mounting arrangement for use, in particular, in fixing a data-storage drive unit or similar unit in position on a support structure such as the chassis of a personal computer and to a computer that employs such a mounting arrangement.

BACKGROUND OF THE INVENTION

A disc drive device is conventionally fitted inside the casing of a modern personal computer. Whether the disc drive is a hard disc drive, a floppy disc drive or an optical storage drive (eg CD or DVD ROM drive), the drive will generally be of a standard form factor and provided with fixing holes in standard positions. Whatever the form or make of the drive, it then becomes possible for a computer manufacturer to provide a standard mounting arrangement that typically takes the form of a metal frame with side bars having fixing holes through which self-tapping screws can be inserted to engage in the holes in the side faces of the drive. Whilst this standard disposition of the holes is of great help to the computer manufacturer, the use of fixing screws for securing the drive in position is not ideal, the fixing operation being intricate and time-consuming.

Another approach for mounting disk drives in a computer chassis involves rails that are assembled to the drives. According to this technique, the drive, with the rail secured thereto, is slid in from the front of the chassis and either snapped or screwed in place.

Examples of this type of mounting can be found, for instance, in U.S. Pat. No. 4,979,909, and U.S. Pat. No. 5,262,923.

Whilst this approach generally provides for ready attachment and release of the drive from the chassis, if the drive, with the attached brackets or rails is screwed in the chassis, it gives rise to the same problems described above. Furthermore, there needs to be a way to secure the rails or other intermediate fixing member that must first be secured to the drive. Screws are often used for this, although U.S. Pat. No. 5,828,547 proposes the use of pins that are slideably receivable in apertures located in opposed sides of a drive.

A variety of other fixing arrangements for disk drives have also been proposed and examples can be found in U.S. Pat. No. 5,301,088, U.S. Pat. No. 5,340,340, U.S. Pat. No. 5,828,547 and U.S. Pat. No. 5,788,211. U.S. Pat. No. 5,768,099 describes the use of a generally U-shaped bracket to which a drive is screwed. The bracket is then mountable within a chassis without the use of screws.

Whilst the existing methods are no doubt generally satisfactory, a need still exists for improving yet further such mounting arrangements to simplify for the user the attachment of subsystem units within a personal computer.

It is therefore an object of the present invention to provide a screwless fixing arrangement for simplifying the attachment of a data-storage drive and similar units to a support structure.

SUMMARY OF THE INVENTION

In brief, this is achieved by a mounting arrangement for mounting a subsystem unit provided with side fixing holes, the arrangement comprising a tray having two upstanding side walls that generally define a space for receiving a subsystem unit, at least one of the side walls being provided with at least one retractable stud and a resilient member for biasing the stud into a position in which the stud extends into the space defined by the side walls in order to engage a side fixing hole in a subsystem unit.

Preferably the, or each, stud comprises an abutment for engaging the edge of the side fixing hole. The abutment can be provided by the step between portions of the stud having different diameters.

This provides a very simple and convenient way for the user to attach and remove a subsystem unit from with a computer chassis, without the use of tools and without the need for a multiplicity of small components, such as rails or pins, that are difficult to manipulate and prone to being lost or mislaid. In at least a preferred embodiment, the user has only a single mounting component to manipulate and this component can be held in one hand during attachment or removal of a subsystem unit therefrom.

The arrangement can comprise a frame member in which the tray is slideably mountable. Preferably, the frame member comprises a wall for engaging the resilient member when the tray is mounted in the frame so as to secure the studs in a position in which the studs engage the side fixing holes in a subsystem unit.

If both side walls of the tray comprise a said resilient member, this arrangement has the advantage of centering the subsystem device in the tray, which improves the external cosmetic appearance of the computer for those subsystem units that have a front face visible from the exterior of the computer.

In at least a preferred embodiment, at least one of the side walls has the resilient member mounted on the outer face thereof, the resilient member being at at least one point in fixed relation with the side wall. The stud for engaging the side fixing hole in a subsystem unit is provided at at least another point of the resilient member, the stud extending through a hole in the side wall. The resilient member has at least one first portion shaped to form a fulcrum acting against the side wall between the fixed point and the stud and a second portion that is separated from the side wall and on the same side of the fulcrum as the fixed point, so that pressure applied to the second portion in the direction of the side wall causes the resilient member to pivot about the fulcrum and retract the stud from the hole thereby to allow a subsystem unit mounted in the tray to be removed therefrom.

Moreover, the use of such a component has the advantage that such a component can, even for unused accessory bays, be delivered with a computer ready-mounted in the chassis—thereby avoiding the need for a user to obtain or store mounting components, such as rails or screws that will be required when the user needs to mount further subsystem accessories in the chassis.

Suitably, the tray can be slideably mountable in the chassis of a personal computer, although other arrangements are possible.

Also provided is a computer having a chassis in which a subsystem unit is mounted using the above described mounting arrangement.

BRIEF DESCRIPTION OF THE DRAWINGS

A personal computer embodying the invention will now be described, by way of non-limiting example, with reference to the accompanying diagrammatic drawings, in which.

BEST MODE OF CARRYING OUT THE INVENTION

Figure 1:
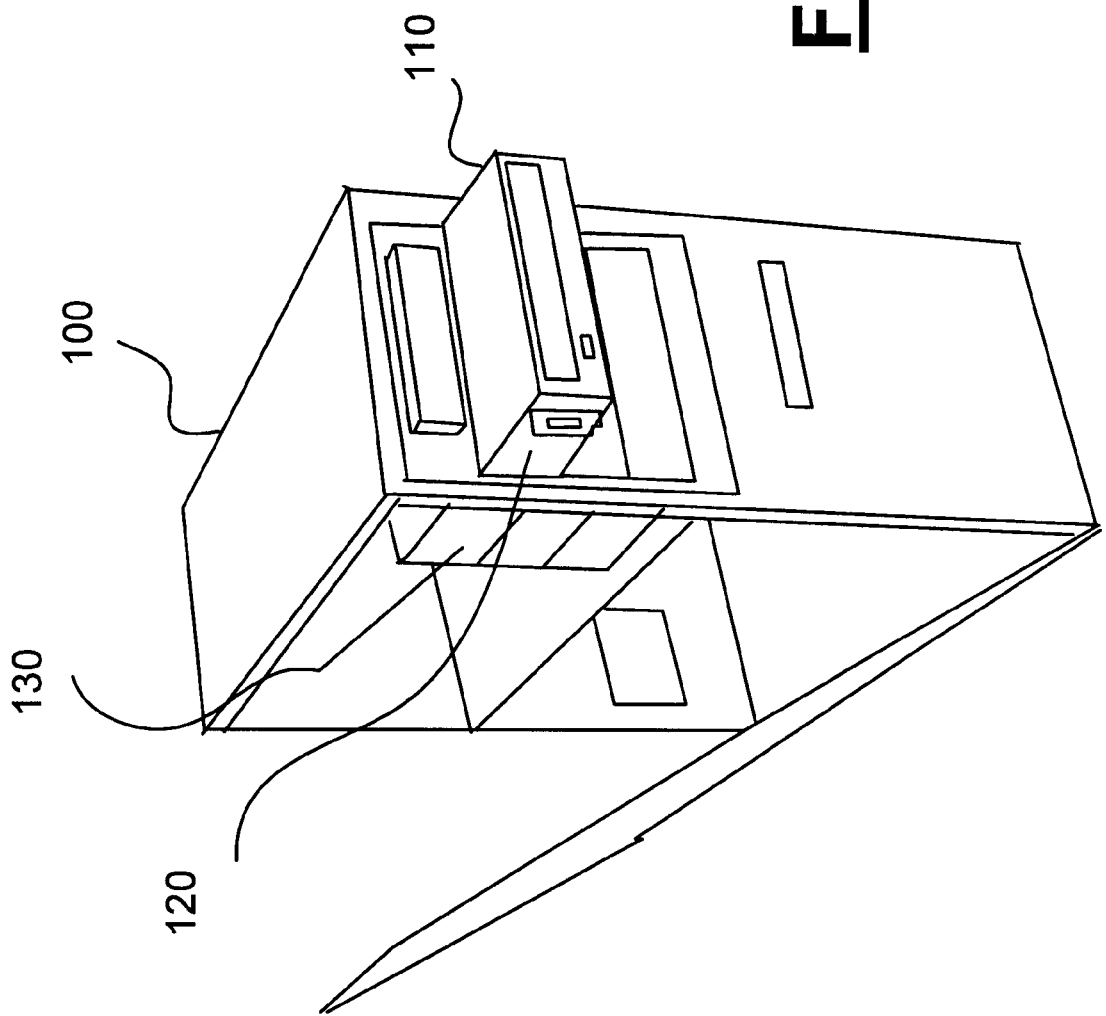
FIG. 1 shows a personal computer.

FIG. 1 shows a personal computer system unit 100 having a tower configuration. CD-ROM drive 110 is mounted within the system unit on a tray 120 which is slideably mounted within a sleeve in a frame 130, itself mounted within the chassis of the computer. In general terms, such sliding tray arrangements are well known in the art of personal computer chassis design. Tray 120 is clipped in place using clips (not shown) that are releasable from the front of the subsystem unit. In normal use, these clips are covered by a cosmetic plastic bezel that is itself clipped in place on the front of the system unit. It will be understood that other ways of fixing tray 120 within the chassis may also be used, for instance the tray may be equally lowered into place to engage slots and flanges arranged on the chassis in the manner described in U.S. Pat. No. 5,768,099.

Figure 2:
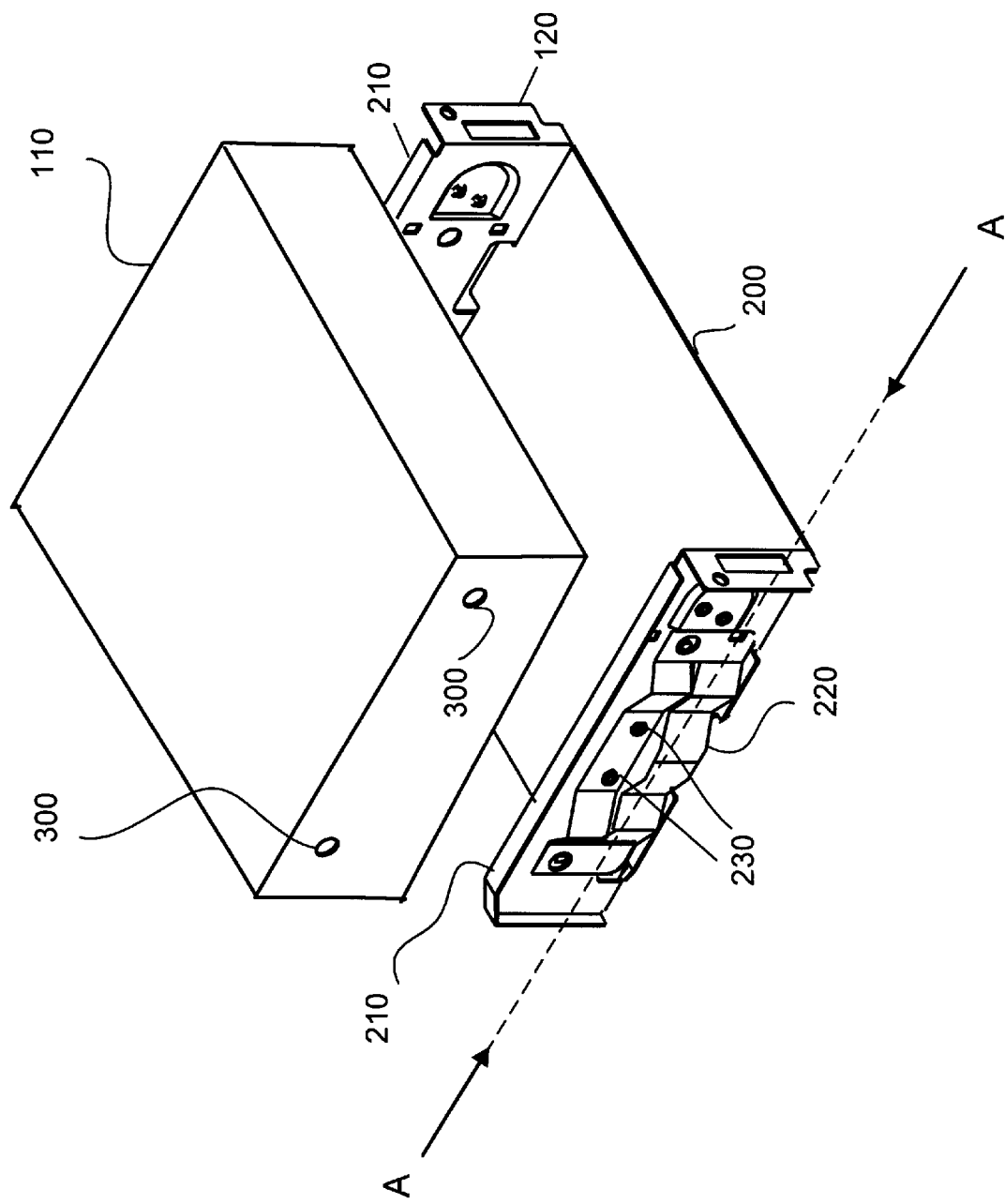
FIG. 2 shows a mounting tray in the computer of FIG. 1.
Figure 3:
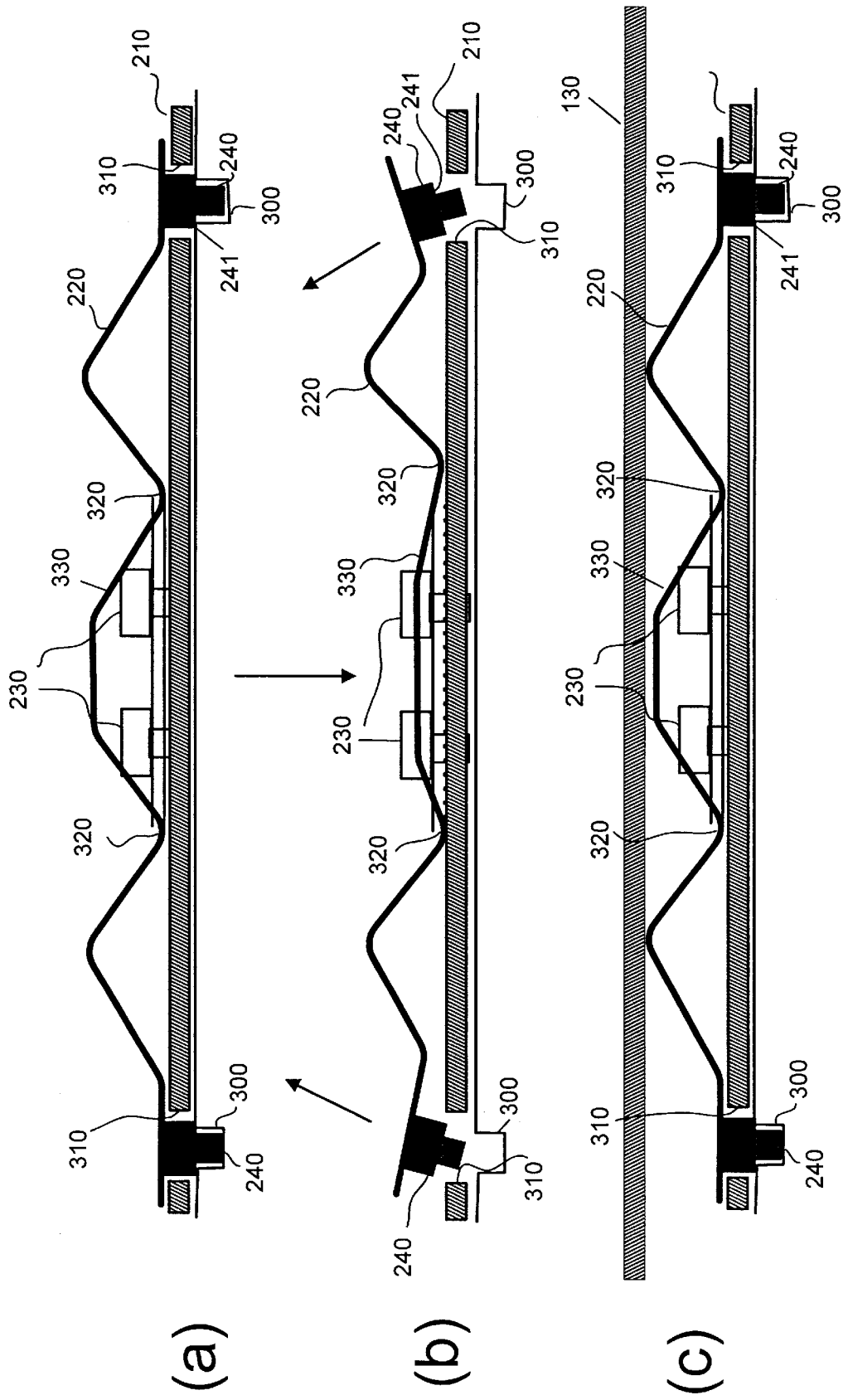
FIG. 3 shows the fixing arrangement of the mounting tray of FIG. 2 in three cross sectional views.

FIGS. 2 and 3 show in more detail the way in which a subsystem unit, such as CD-ROM drive 110, is mounted within tray 120 in one embodiment of the present invention.

As can be seen in FIG. 2, tray 120 has a base 200 and two upstanding side walls 210. Side walls 210 each have a resilient member 220 mounted on the outer face thereof. Resilient member 220 comprises a fixed portion and a movable portion, the fixed portion being laterally displaced from the movable portion and separated therefrom by a longitudinal slit to allow the movable portion to move with respect to the fixed portion.

Resilient member 220 is permanently fixed at two points 230 on the fixed portion to the side wall using suitable fixing means such as screws or rivets.

As can be seen more clearly in FIG. 3 which shows cross sections along line A—A, member 220 is provided with studs 240 for engaging side fixing holes 300 in the subsystem unit 110, the studs 240 extending through holes 310 in the side walls 210.

Studs 240 comprise an abutment for engaging the edge of the side fixing hole and allowing resilient member 220 to apply force directly to subsystem unit 110. In this embodiment, the abutments take the form of a step 241 between portions of the stud having different diameters. The holes 310 are large enough to allow the step 241 to pass through.

Member 220 is shaped so that portions 320 form fulcrums acting against side wall 210 between the fixed points 230 and the studs 300. A central part 330 of member 220 is separated from side wall 210. The rest position of member 220 is shown in FIG. 3a. When member 220 is in this position and subsystem unit 110 is in position in tray 120, subsystem unit 110 is locked in place by studs 240.

When pressure is applied to the central part 330 of member 220 in the direction of the side wall as shown by the arrows in FIG. 3b member 220 deforms to pivot about the fulcrum parts 320 and retract studs 300 from holes 310 as shown in FIG. 3b.

Studs 240 are located on resilient member 220 laterally displaced with respect to central part 330 and aligned with fixed points 230.

Retractable studs 240 are provided on both side walls of tray 120. As can be seen in FIG. 3c, when tray 120 is mounted in frame 130, a wall of frame 130 acts on member 220 at points 242 between the fulcrum parts 320 and the studs. Member 220 in turn acts directly on the subsystem unit to secure studs 240 firmly in holes 300 and to centre subsystem unit 110 within frame 130.

Studs 240 and resilient member 220 are made of metal and therefore provide a grounding path for a subsystem unit mounted in tray 120.

Since the width of tray 120 is such that it can easily be grasped in one hand by a user, it is very easy and convenient for a user to use one hand to apply pressure to the central parts 330 on both side walls of tray 120 to retract all four studs 240. In this way, a subsystem unit mounted in tray 120 can be removed from the tray with the user's other hand without the use of tools.

Once the subsystem unit has been removed and the pressure released by central parts 330, member 220 is resiliently biased to return to the rest position shown in FIG. 3a.

Although in this embodiment four studs are used to retain subsystem unit 110 in place, it would of course be possible to use any number of retractable studs corresponding to fixing holes in subsystem unit 110, or any combination of fixed studs and retractable studs, as long as subsystem 110 can be removed from tray 120 when the retractable studs are retracted.

Although a specific embodiment of the invention has been described, the invention is not to be limited to the specific arrangement so described. The invention is limited only by the claims. The claims themselves are intended to indicate the periphery of the claimed invention and are intended to be interpreted as broadly as the language itself allows, rather than being interpreted as claiming only the exemplary embodiment disclosed by the specification.

What is claimed is:

1. A mounting arrangement for mounting a subsystem unit provided with side fixing holes, the arrangement comprising
    a tray having two side walls that generally define a space for receiving a subsystem unit;
    at least one of the side walls being provided with one or more retractable studs and a resilient member mounted on an outer face thereof which, in an absence of external pressure applied to the resilient member, each stud extends into the space defined by inner surfaces of the side walls in order to engage a side fixing hole in a subsystem unit, wherein
    the resilient member has a first point in fixed relation with the side wall;
    at least a first of said studs is provided at another point of the resilient member and extends through a corresponding hole in the side wall; and
    the resilient member has at least a first portion shaped to form a fulcrum acting against the side wall between said first point of the member that is in fixed relation with the side wall, and has a second portion that is separated from the side wall and on the same side of the fulcrum as said first point, so that pressure applied to the second portion in the direction of the side wall causes the resilient member to pivot about the fulcrum and retract said first stud from the corresponding hole, thereby to allow a subsystem unit mounted in the tray to be removed therefrom.

2. A mounting arrangement as claimed in claim 1 wherein each stud comprises an abutment for engaging the edge of the side fixing hole.

3. A mounting arrangement as claimed in claim 2 wherein the abutment is provided by a step between portions of the stud having different diameters.

4. A mounting arrangement as claimed in claim 2 wherein the abutment is provided by the step between portions of the stud having different diameters, the hole in the side wall being sized so that both portions of the stud can pass therethrough.

5. A mounting arrangement as claimed in claim 1 further comprising a frame member, the tray being slideably mountable in the frame member, wherein the frame member comprises a wall for engaging the resilient member when the tray is mounted in the frame so as to secure the studs in a position in which the studs would engage the side fixing holes provided in a subsystem unit which was mounted in the mounting arrangement.

6. A mounting arrangement as claimed in claim 1 wherein both side walls of the tray comprise a said resilient member.

7. A mounting arrangement as claimed in claim 1 wherein the resilient member comprises a fixed portion comprising the point of the member that is in fixed relation with the side wall and a movable portion comprising said second portion, the fixed portion being laterally displaced from the movable portion and separated therefrom by a longitudinal slit.

8. A mounting arrangement as claimed in claim 1 wherein the resilient member comprises two studs and two of said first portions symmetrically disposed around the second portion.

9. A mounting arrangement as claimed in claim 1 wherein the tray is slideably mountable in a chassis.

10. An electronic appliance comprising a chassis which includes a mounting arrangement for mounting a subsystem unit as claimed in claim 1.

11. A computer comprising a chassis which includes a mounting arrangement for mounting a subsystem unit as claimed in claim 1.

12. A computer as claimed in claim 11 further comprising a frame member, the tray being slideably mounted in the frame member, wherein the frame member comprises a wall for engaging the resilient member when the tray is mounted in the frame so as to secure the studs in a position in which the studs engage the side fixing holes in a subsystem unit which was mounted in the mounting arrangement of the computer chassis.

13. A mounting arrangement for mounting a subsystem unit provided with side fixing holes, the arrangement comprising a tray having two side walls that generally define a space for receiving a subsystem unit;

at least one of the side walls being provided with one or more studs;

a mechanism that enables the studs to be retracted through corresponding openings in the side walls, the mechanism including a resilient member mounted on the side wall which, when no external pressure is applied to the resilient member, each stud extends into the space defined by the inner surfaces of the side walls in order to engage a side fixing hole in a subsystem unit; and when external pressure is applied to the resilient member, each stud moves away from the space defined by the inner surfaces of the side walls; and a frame member in which the tray is slidably mountable, the frame member comprising a wall for engaging the resilient member when the tray is mounted in the frame so as to secure the studs in a position in which the studs would engage the side fixing holes provided in a subsystem unit which was mounted in the mounting arrangement.

14. A mounting arrangement as claimed in claim 13, wherein each stud comprises an abutment for engaging the edge of the side fixing hole.

15. A mounting arrangement as claimed in claim 14, wherein the abutment is provided by a step between portions of the stud having different diameters.

16. A computer comprising a chassis which includes a mounting arrangement as claimed in claim 13 for mounting a subsystem unit.

17. A computer as claimed in claim 16 which at least one of the side walls of the tray has the resilient member mounted on an outer face thereof;

the resilient member has at least one point in fixed relation with the side wall and with one of said studs which is provided elsewhere on the resilient member for engaging a side fixing hole in a subsystem unit, said one stud extending through a corresponding hole in the side wall; and the resilient member has at least a first portion shaped to form a fulcrum acting against the side wall between said first point of the member that is in fixed relation with the side wall, and has a second portion that is separated from the side wall and on the same side of the fulcrum as said first point of the member, so that pressure applied to the second portion in the direction of the side wall causes the resilient member to pivot about the fulcrum and retract said first stud from the corresponding hole, thereby to allow a subsystem unit mounted in the tray to be removed therefrom.

18. A computer as claimed in claim 17 wherein each stud comprises an abutment for engaging the edge of the side fixing hole.

19. A computer as claimed in claim 18 wherein the abutment is provided by a step between portions of the stud having different diameters.

20. A mounting arrangement for mounting a subsystem unit provided with side fixing holes, the arrangement comprising a tray having two oppositely facing side walls that generally define a space for receiving a subsystem unit;

the side walls being provided with at least one stud and a mechanism for retracting the stud through an opening in the side walls;

the mechanism including a resilient member mounted on the side walls which, when no external pressure is applied to the resilient member, each stud extends into the space defined by the inner surfaces of the side walls in order to engage a side fixing hole in a subsystem unit; and when external pressure is applied to the resilient member, each stud moves away from the space defined by the inner surfaces of the side walls;

wherein each stud comprises an abutment for engaging the side fixing hole so that the action of the resilient member acting on the stud causes the subsystem unit to be self-centered in the tray.

21. A mounting arrangement as claimed in claim 20 comprising a frame member, the tray being slideably mounted in the frame member, wherein the frame member comprises a wall for engaging the resilient member when the tray is mounted in the frame so as to secure the studs in a position in which the studs engage the side fixing holes in a subsystem unit.

22. A mounting arrangement as claimed in claim 20 wherein the abutment is provided by a step between portions of the stud having different diameters, said step being dimensioned so as to engage the edge of the side fixing holes.

23. A mounting arrangement as claimed in claim 20 in which
- at least one of the side walls of the tray has the resilient member mounted on an outer face thereof;
- the resilient member has a first point in fixed relation with the side wall, and a first of said studs being provided at another point of the resilient member and extending through a corresponding hole in the side wall; and
- the resilient member has at least a first portion shaped to form a fulcrum acting against the side wall between said first point of the member that is in fixed relation with the side wall, and has a second portion that is separated from the side wall and on the same side of the fulcrum as said first point of the member, so that pressure applied to the second portion in the direction of the side wall causes the resilient member to pivot about the fulcrum and retract said first stud from the corresponding hole, thereby to allow a subsystem unit mounted in the tray to be removed therefrom.

24. A computer comprising a chassis which includes a mounting arrangement for mounting a subsystem unit as claimed in claim 23.

25. A computer as claimed in claim 24 in which
- at least one of the side walls of the tray has the resilient member mounted on an outer face thereof;
- the resilient member has a first point in fixed relation with the side wall, and a first of said studs being provided at another point of the resilient member and extending through a corresponding hole in the side wall; and
- the resilient member has at least a first portion shaped to form a fulcrum acting against the side wall between said first point of the member that is in fixed relation with the side wall, and has a second portion that is separated from the side wall and on the same side of the fulcrum as said first point of the member, so that pressure applied to the second portion in the direction of the side wall causes the resilient member to pivot about the fulcrum and retract said first stud from the corresponding hole, thereby to allow a subsystem unit mounted in the tray to be removed therefrom.

\* \* \* \* \*